June 19, 1956  M. MAUL  2,751,007
MACHINES FOR TRANSFERRING RECORDS FROM ONE CARD TO ANOTHER
Filed Aug. 5, 1952  8 Sheets-Sheet 1

Inventor:
Michael Maul

June 19, 1956  M. MAUL  2,751,007
MACHINES FOR TRANSFERRING RECORDS FROM ONE CARD TO ANOTHER
Filed Aug. 5, 1952  8 Sheets-Sheet 3

Inventor:
Michael Maul

Fig. 6

June 19, 1956　　　M. MAUL　　　2,751,007
MACHINES FOR TRANSFERRING RECORDS FROM ONE CARD TO ANOTHER
Filed Aug. 5, 1952　　　　　　　　　　　　　　　8 Sheets-Sheet 6

Inventor:
Michael Maul

June 19, 1956  M. MAUL  2,751,007
MACHINES FOR TRANSFERRING RECORDS FROM ONE CARD TO ANOTHER
Filed Aug. 5, 1952  8 Sheets-Sheet 7

Inventor:
Michael Maul

June 19, 1956    M. MAUL    2,751,007
MACHINES FOR TRANSFERRING RECORDS FROM ONE CARD TO ANOTHER
Filed Aug. 5, 1952    8 Sheets-Sheet 8

Inventor:
Michael Maul

United States Patent Office 2,751,007
Patented June 19, 1956

---

2,751,007

MACHINES FOR TRANSFERRING RECORDS FROM ONE CARD TO ANOTHER

Michael Maul, Schwabach, near Nurnberg, Germany

Application August 5, 1952, Serial No. 302,752

Claims priority, application Germany August 14, 1951

11 Claims. (Cl. 164—115)

The present invention relates to a machine for recording data upon multi-deck receiving cards under the control of multi-deck pattern cards.

A main object of the invention is to provide a machine of the above type for operating on multi-deck cards having in each deck a plurality of adjacent record columns, each column being adapted to represent in index positions of the column a character designation, said machine being constructed to effect transfer of data in a given deck of a pattern card either to the corresponding deck of a receiving card or to any other deck of said receiving card. To this end a machine for recording data upon multi-deck receiving cards under the control of multi-deck pattern cards, comprises the combination of analyzing means common to all decks, recording means common to all decks, means for controlling said recording means by said analyzing means, means for feeding pattern cards consecutively to said analyzing means, means for feeding receiving cards consecutively to said recording means, both said feeding means normally operating synchronously to present corresponding decks of a pattern card and of a receiving card concomitantly to the analyzing means and to the recording means respectively, and means for varying the timing of the presentation of the pattern cards to the analyzing means in relation to the timing of the presentation of the receiving cards to the recording means.

Preferably the variation in the timing of the presentation of the pattern cards to the analyzing means in relation to the timing of the presentation of the receiving cards to the recording means is effected by varying the timing of one of the card feeding means in relation to the timing of the other card feeding means.

For example the machine may include means, selectively operable, to impart optionally a lag or a lead to the timing of the presentation of the pattern cards to the analyzing means in comparison with the timing of the presentation of the receiving cards to the recording means, said lag or lead having an extent equal to one deck or to a multiple thereof.

Alternatively the relative timing of the two card feeding means may remain invariable and the analyzing means may be displaced along the card path relatively to the recording means or vice versa.

The recording means may be a punching device or, if the receiving cards are to be used as index cards, without perforations, then the recording means may be a printing device.

In addition the machine may include means (not shown) for effecting column interchangeability between the columns of a given deck.

An embodiment of the invention constructed as a reproducer for perforated cards is illustrated in the accompanying drawings.

Figure 1:
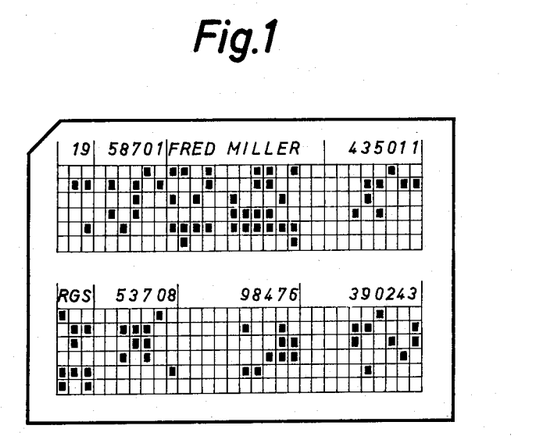
Fig. 1 shows the perforated card as used as a controlling card in the machine described herein.
Figure 2:
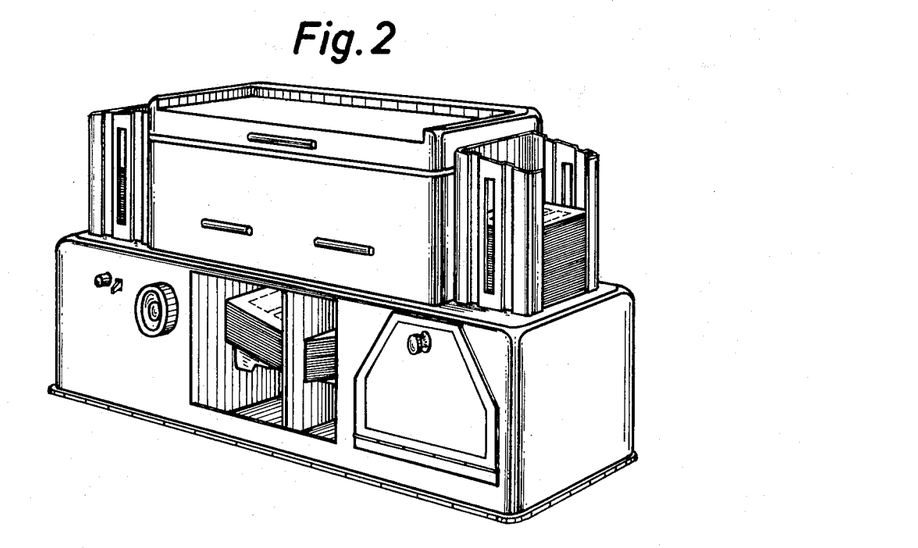
Fig. 2 shows a perspective general view of the machine.

The machine is controlled by cards as shown in Fig. 1. The receiving cards look alike, however, they are generally punched in a smaller number of fields. The card has two decks each comprising 30 columns each with 6 positions. During the operation the cards run towards each other in opposite directions. The perforations in the cards are in the form of hole combinations. The machine transfers perforation data which are already entered in the cards of the one card stack to the cards of the receiving card stack. The data of the one card may be transferred to the other card as will be explained in detail later. In the further description the controlling card will be designated as card I and the receiving card as card II.

Figure 9:
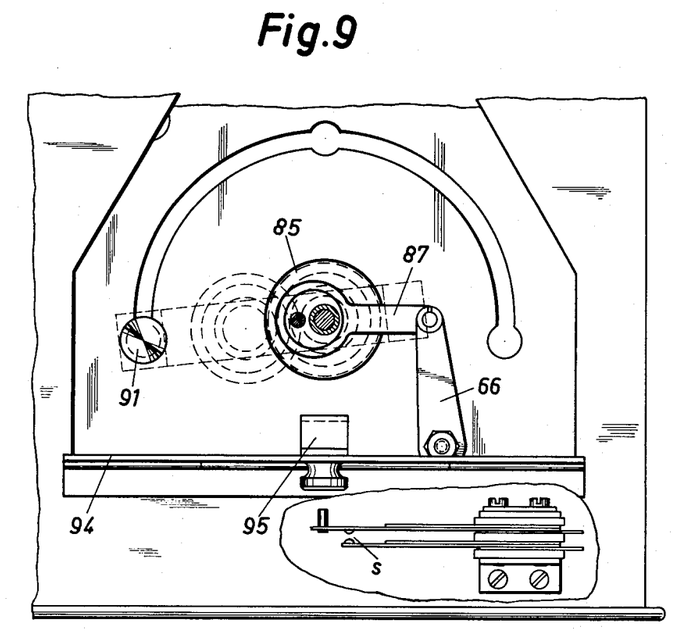
Fig. 9 shows the gear for the adjustment of the lead or lag of the one perforated card.
Figure 10:
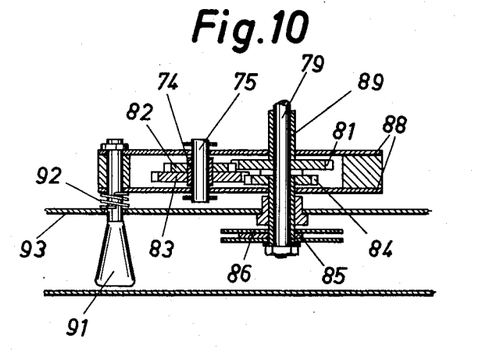
Fig. 10 shows a section through this gear.

An adjustment device is provided in the machine which permits each deck of card I to be set to any desired deck of card II. This device (Figs. 9 and 10) is so constructed that it will cause card I which is running past the row of analyzing brushes to attain a lead or a lag with respect to the other card. The device may be adjusted for three positions. In the middle position the transfer is effected from one deck of the one card to the same deck of the other card. However, if the operating knob 91 of this device is adjusted to the right (Fig. 3) the transfer is effected from the lower deck of card I to the upper deck of card II, and upon adjustment to the left hand position transfer will take place from the upper deck of card I to the lower deck of card II. The construction of the adjustment device will be described in detail later on.

Analysis and perforation of the cards

The control cards are fed in the direction of their shorter axes by a card knife from the magazine 12 to feed rollers which feed them step by step past the analyzing device so that they are analyzed index point by index point and consecutive decks pass the analyzing device successively. The receiving cards are similarly fed in the direction of their shorter axes from the magazine 13 to feed rollers which feed them step by step past the punching device so that they are punched index point by index point and consecutive decks passing the punching device successively feed the cards past the analyzing or the punching device. After the analysis or the perforation the cards are deposited in the magazines 16 or 17.

Figure 4:
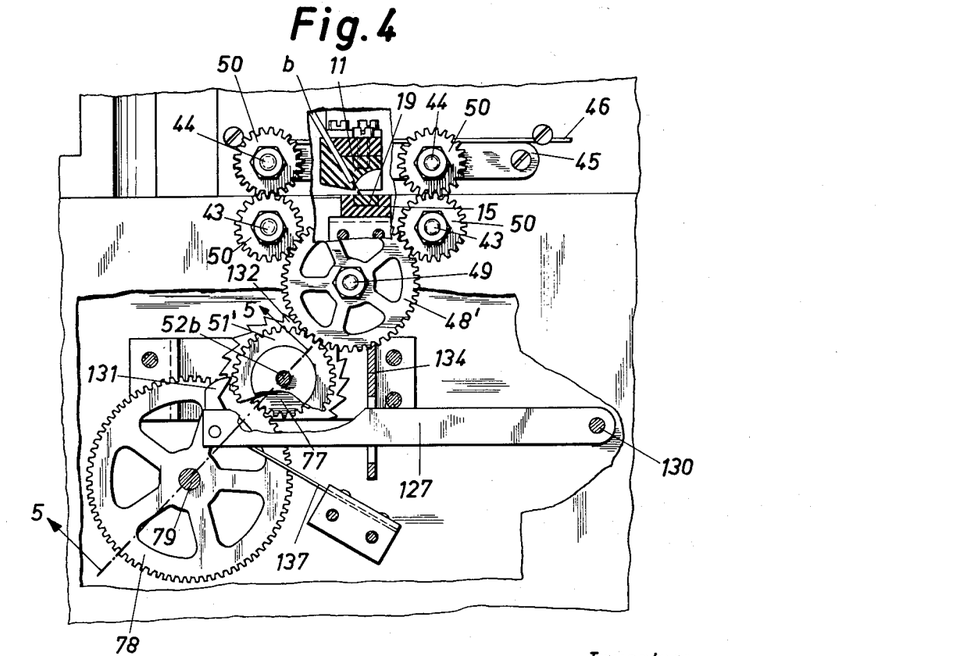
Fig. 4 shows the construction of the analyzing brushes and the drive for the card feed.

The analysis is effected by brushes $b$ (Fig. 4). They are mounted in the brush holder 11 which is fastened to the side walls of the machine. The brushes are supplied with current by the contact plate 19 which is inserted in the insulating body 15 which is also mounted on the side walls of the machine.

Figure 6:
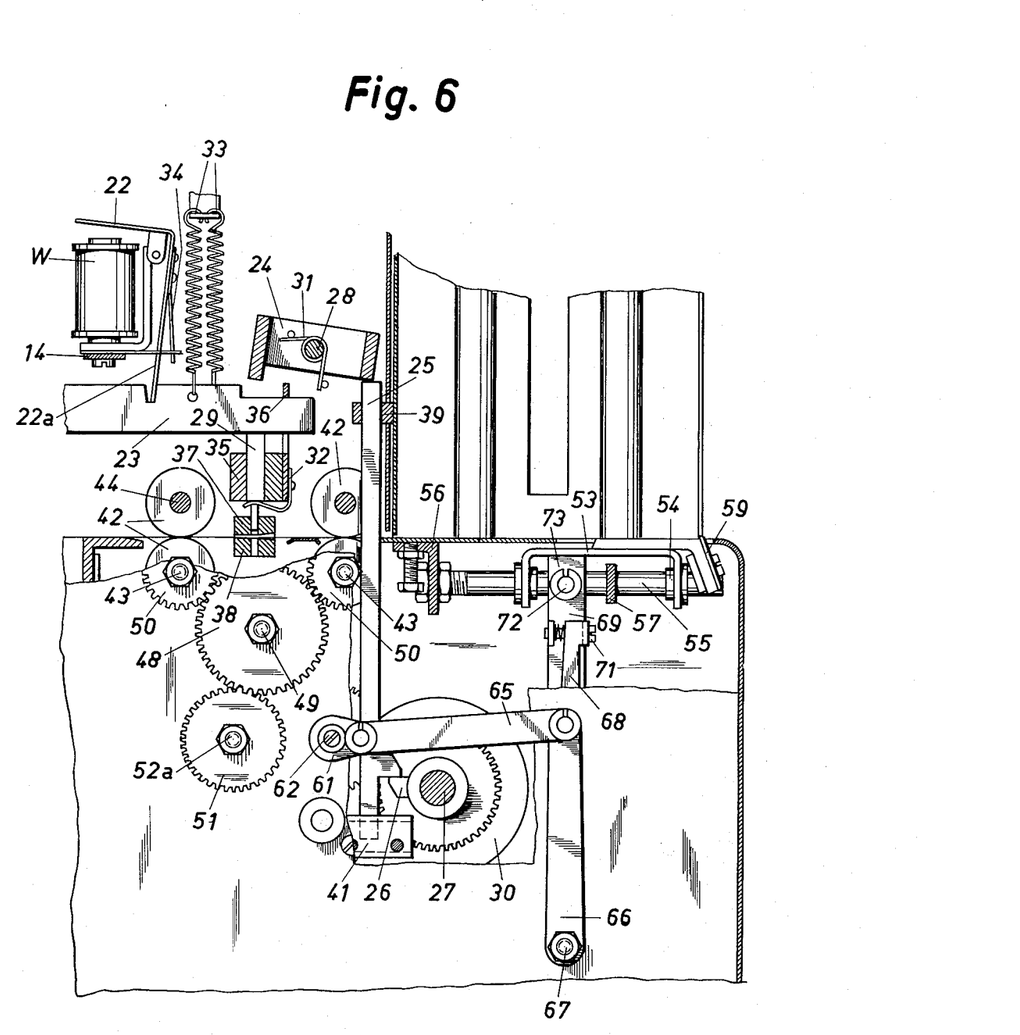
Fig. 6 shows the arrangement of the punching device and the card supply.

The brushes may receive current from the contact plate 19 through the holes of the card I and may conduct this current to the selector magnets W (Fig. 6). Upon energization the latter will attract their armatures 22 moving, by means of their arms 22a, the selector bars 23 to the right (Fig. 6) so that the full depth of the latter will come under the punching yoke 24.

Through the cam 26 on the shaft 27 the punching yoke 24 is rocked through the pusher bar 25 in counter-clockwise direction about its shaft 28 thus pressing the displaced selector bars 23 downward. The latter will engage their punches 29 and will press the same through the card II which moves in synchronism with the card I. The shaft 28 for the punching yoke is mounted on the side walls of the machine. The spring 31 will restore the yoke 24 and the pusher bar 25 to their home position again. The pusher bar is guided at its upper part in the guide 39 and at its lower part in the bracket 41. The guide 41 serves at the same time as a stop for the movement of the pusher bars in downward direction.

Figure 3:
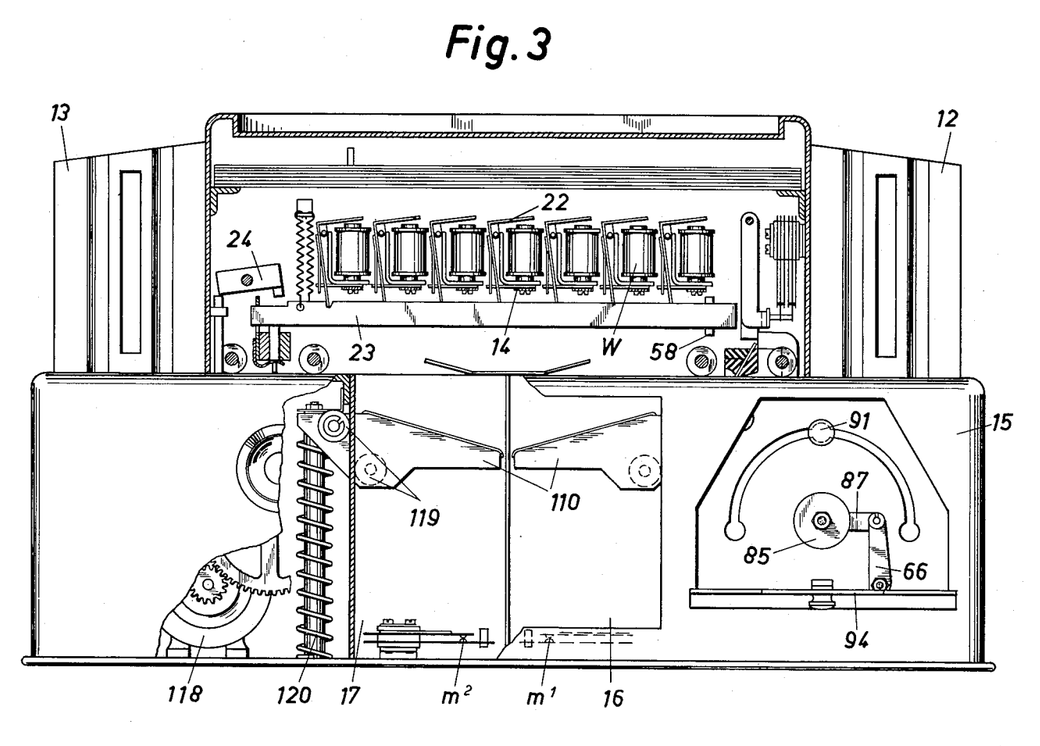
Fig. 3 shows the machine partially in section and partially in front view.

The punches 29 are guided by their shanks in a cross bar 35 which is fastened to the side walls of the machine. The rectangular part of the punch is also separately guided in a cross bar 37 which is fastened to the matrix 38. Between the cross bar 37 and the matrix 38 there is a gap through which the card may be fed. The springs 32 urge the punches 29 to their home position. By springs 33 and through the armature 22, by means of spring 34, the selector bars 23 are restored to their home position. The selector bars are guided in slots of the plate 36, which is fastened to the cross bar 35 and in slots of the plate 58 (Fig. 3). The selector magnets W are screwed to the stirrups 14 which are fastened to the side walls of the machine.

*Card feed*

The cards I are inserted in the magazine 12 and the cards II in the magazine 13 (Fig. 3) as has already been mentioned. Below the two magazines there are slides 53 (Fig. 6) which may slide to and fro upon the round guides 55. At the one end the guides 55 are screwed to the bracket 56 and are moreover held by the cross bar 57. The slides 53 carry two adjustable knives 59. The movement of the slide is effected by the crank 61 on the shaft 62 which is driven through gears 63 and 64 (Fig. 7) from the locking wheel shafts 52a and 52b respectively rotating once per card cycle. The locking wheel shaft 52a serves for the drive of the card feed for card II and the locking wheel shaft 52b (see Figure 4) for the drive of the card feed for card I. The ratio of the gears is 1:1. Through link 65 the rocker 66 is connected to the crank 61 (Fig. 6) said rocker being fast upon the shaft 67. Upon this shaft there is also fast the lever 68. The lever 69, however, is loosely rotatable upon the shaft 67. It is connected through set screw 71 to the lever 68 and may be displaced with respect to the latter by means of the screw thereby permitting an exact adjustment of the card knives. At its upper end the lever 69 is forked and embraces a bolt 72 seated in an arm 73 of the slide 53 and moving the latter during the rocking movement of the lever. The card knives 59 will then move the cards between the rollers 42.

The feed of the card to the analyzing or punching device and finally to the card receivers is effected by the rollers. The shafts 43 of the lower rollers are mounted in the side walls of the machine whereas the shafts for the upper rollers are mounted in the arms 45 (Fig. 4) the latter being urged downward by the springs 46. To the one end of the shafts 43 are fastened gears 50. The gears of the upper rollers are in each instance driven by those of the lower rollers. Moreover, the gears of the lower rollers mesh with idle gears 48 and 48' driven by the gears 51 and 51' on the shafts 52a and 52b respectively.

The drive of the shafts 52a and 52b respectively is effected step by step from the motor 118 (Fig. 3 or Figure 7) by means of a step by step shifting mechanism. Through pinion 121 (Figs. 7 and 8) the motor drives the wheel 122 fast upon the shaft 123. On the shaft 123 there is also mounted the pinion 124 which engages the gear 109 of the shaft 112. All the shafts just described are mounted in the side walls of the machine. The gear 109 meshes with the gear 125 which is rigidly connected to the cam 126 and is freely rotatable upon the shaft 52a. The cam 126 actuates a lever 127 having a pawl 128 mounted on its arm 127a. The ratchet wheel 129 and therewith the shaft 52a are driven step by step by the pawl 128.

The drive of the shaft 52b is effected in the same manner through lever 127 rockably mounted about a pivot bolt 130 in the middle portion of the machine and carrying on its other end the pawl 131 (Fig. 4) which engages the ratchet wheel 132. The lever 127 moves in the guides 133 and 134 (Figs. 4 and 7) and is drawn towards the cam 126 by the spring 135. The pawls 128 and 131 are resiliently urged against the ratchet wheels 129 and 132. In order to prevent a backward movement of the ratchet wheels 129 and 132 detent springs 136 and 137 are provided. Accordingly the lever 127 driven by the cam 126 drives at the same time the ratchet wheels 129 and 132 through the pawls 128 and 131.

When the cards have passed through the analyzing and punching device respectively they will drop into the card receivers 16 or 17 in which the card supports 110 (Fig. 3) are provided. The supports are guided by the rollers 119 and are urged upwardly by the springs 120. The springs are so proportioned that they will yield in accordance with the weight of the card. When the card support has reached its lowest position it will open its contacts $m^1$ and $m^2$ respectively thereby stopping the machine.

*The drive for the adjustment of the lead and lag of the card movement*

In order to permit operation on different decks the card carriage or the card knives respectively for the one card partake of a leading or a lagging movement with respect to the other card, as already mentioned. For this purpose a planetary gearing is installed (Figs. 9 and 10) in the drive of the card carriage which is under the magazine 12 in which the cards I are inserted. Accordingly the drive is not effected by a crank, as for the above described card knives for the magazine 13, but by the eccentric 85. Otherwise the card knives and their guide are constructed in just the same manner as those under the magazine 13 and will therefore not be further described.

Figure 5:
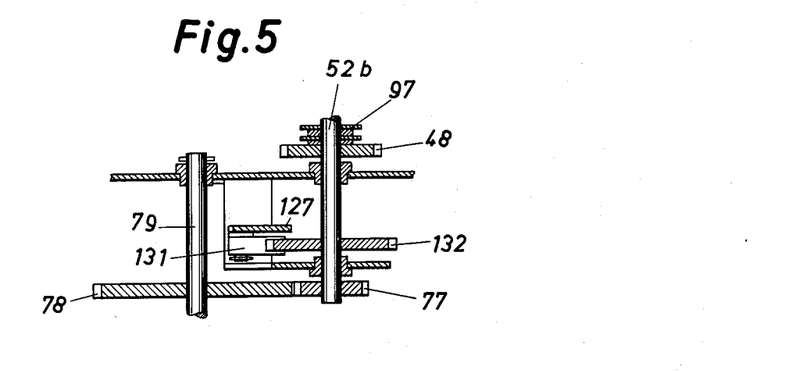
Fig. 5 shows a section through the pawl drive for the card feed.

The drive for the planetary gearing is transmitted from the ratchet wheel shaft 52b by means of gear 77 (Figs. 4 and 5) to gear 78 of the shaft 79. On this shaft is fastened the toothed wheel 81 (Fig. 10) of the gearing. The latter drives the gear 82 which together with the gear 83 is pressed on to the sleeve 74 which can loosely rotate upon the stud 75. The gear 83 engages the gear 84 which together with the eccentric 85 is mounted on a sleeve 86 which is freely rotatable on the shaft 79. The lever 66 is linked to the eccentric 85 by means of the pusher bar 87 (Fig. 9) said lever transmitting its rocking movements to the carrier of the card knives. The stud 75 carrying the gears 82 and 83 is fastened in two arms 88 which may rotate about the shaft 79. If the arms 88 are rocked by a certain angle about the shaft 79 the driving gear 84 will receive an additional movement with respect to the driving gear 81, said movement causing a lead or a lag. From the desired lead or lag and the ratio in the planetary gearing will result a precisely determined angle of rocking for the two arms 88. In accordance with this angle these arms are rigidly locked in this position. For the displacement of the arms 88 there is provided a hand knob 91 on the same, projecting through the front wall of the machine. The handle 91 may be moved in axial direction in the arms and is pressed outwardly by the spring 92 through a collar 93. The position of the collar has been so chosen that it extends into the recess of the side wall thereby arresting the rotary arms in a predetermined position. If the handle is pressed inwardly the collar will leave the side wall whereby the locking is released so that the handle and consequently also the rotary arms 88 may be brought into another position.

Figure 11:
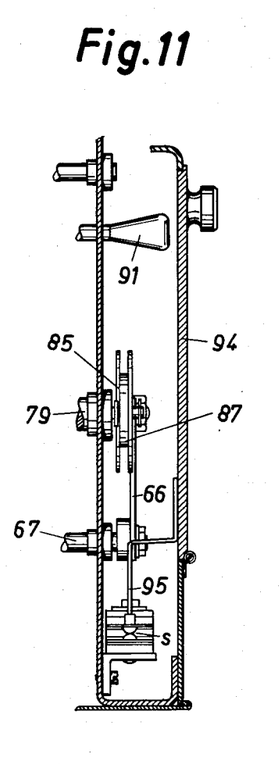
Fig. 11 shows the arrangement of the safety contact.

This displacement must only be possible while the machine is stationary since displacement during operation would lead to wrong perforations. For this reason the handle 91 is only accessible through a door 94 (Fig. 11). In the same moment in which the door 94 is opened the machine is switched off through the contact s. The actuation of the contact s is caused by the bracket 95.

Plug board

In the instant machine an arbitrary column interchanging is possible within the decks. The wiring device is easy to supervise and easy in operation which is obtained by wireless plugging.

Each switching element which is to be combined with another one, such as for instance the brushes with the selector magnets, has a bar associated therewith. The bars are so arranged relatively to each other that they cross the bars of the switching elements to which they are to be electrically connected. Bars crossing each other are arranged in different layers. Wherever there is a crossing there is a hole in the bars. Through the plugs the connection between the bars may be established by inserting said plugs at the corresponding crossing points.

Figure 14:
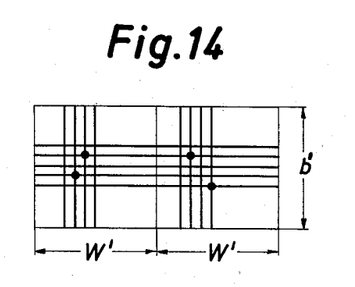
Figs. 14 to 16 show the construction of the plug board permitting interchangeability between the columns within a deck.
Figure 15:
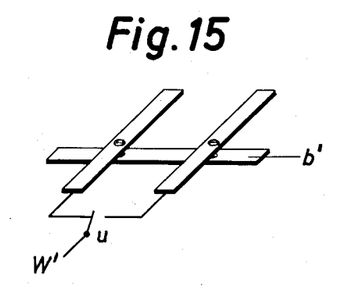
Figure 16:
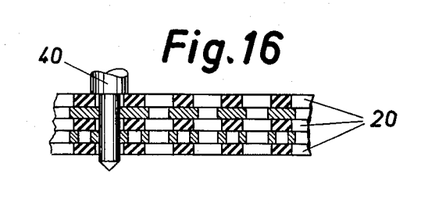
Figure 17:
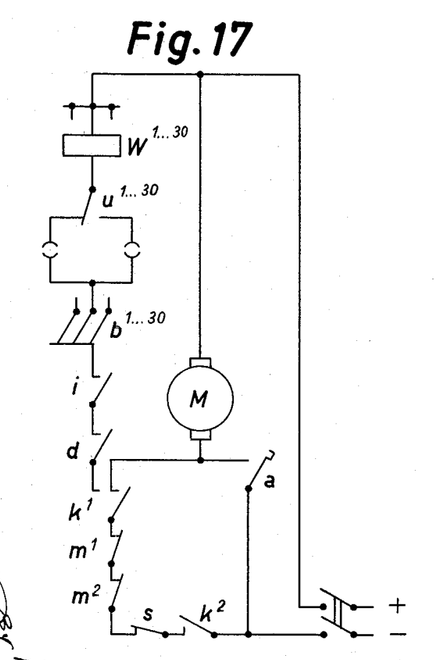
Fig. 17 shows the wiring diagram of the machine.

In accordance with the two decks the plug board is divided into two plug fields as diagrammatically illustrated in Fig. 14. The brushes are connected to the range b' and the selector magnets for the punching device to both of the ranges W'. Accordingly from each selector magnet two connections lead to the plug board each one of them leading to one or both of the fields. If now the first deck is under the analyzing and punching deck respectively, the selector magnets are connected to the left hand field W'. If the second deck is under the analyzing and marking device respectively, the selector magnets are connected to the right hand field. Consequently on setting the machine to the left hand field the first deck is connected up and on setting the machine to the right hand field the second deck is connected up. The arrangement of the bars for one brush and one selector magnet may be seen from Fig. 15. Fig. 16 shows the section through the plug board. The two layers of bars are separated from each other by the insulating plates 20. The connection between two bars is effected by the plugs 40.

As may be seen from Fig. 1 the designation of the columns extends serially from the upper to the lower deck. This designation may now be entered in a corresponding serial manner over the whole range W' since this range comprises 60 bars each bar being associated with a column. On wiring of the plug board for the connections of the punching device the division into two decks therefore no longer appears which facilitates the operation.

If transfer to the same deck is not effected but the transfer is effected from the first deck to the second deck or vice versa the same plug board may be used for the column selection. On transfer from the first to the second deck the right hand plug field and on transfer from the second to the first deck the left hand plug field is connected up. As mentioned above the punching devices are connected in the two ranges W' one bar being provided for each column. Accordingly, it is only necessary to consider into which column transfer is to take place whereby the deck or the plug field is already determined, whether the transfer is effected into identical or different decks. Since the transfer from the first to the second deck or vice versa must take place always in a separate run, accordingly in this instance always only one of the two plug fields will be wired up.

Contact control

Figure 12:
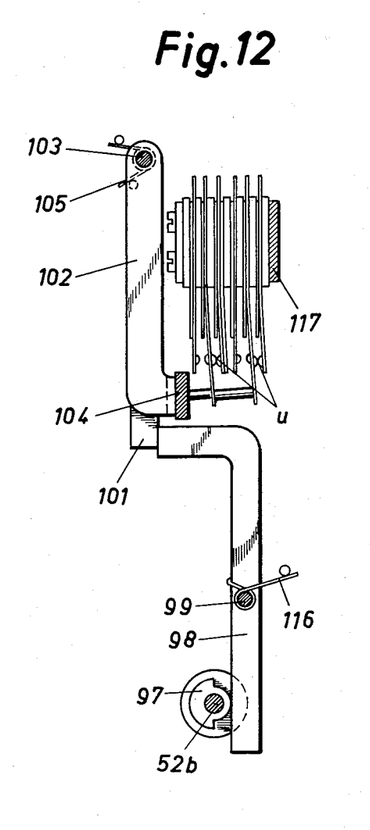
Fig. 12 shows the actuating means for shifting contacts which alternately connect the column selectors of each of the two decks to the common analyzing and punching means.

As just described, if another deck arrives under the brushes (deck change) or if the next card is passed under the brushes (card change) the selector magnets are shifted to the bars associated with the other deck. This shifting is effected by means of contacts u arranged between the bars and the selector magnets. Accordingly 30 contacts u must be provided. The 30 contacts u are fastened on the stirrup 117 (Fig. 12) which is screwed to the side walls of the machine. In order to save space always two shifting contacts have been arranged one above the other. The contacts are actuated by the yoke 104 which is fixed to the arms 102 on the shaft 103. To the shaft 103 the lever 101 is also fastened which is rocked through lever 98 by cam 97 in counterclockwise direction. The yoke 104 is held by spring 105 in its home position. The lever 98 is pressed by the spring 116 against the cam 97. The latter is seated on the shaft 52b which rotates once per card cycle. The dimensions and position of the cam have been so chosen that it will shift the contacts on each deck or card change.

Figure 7:
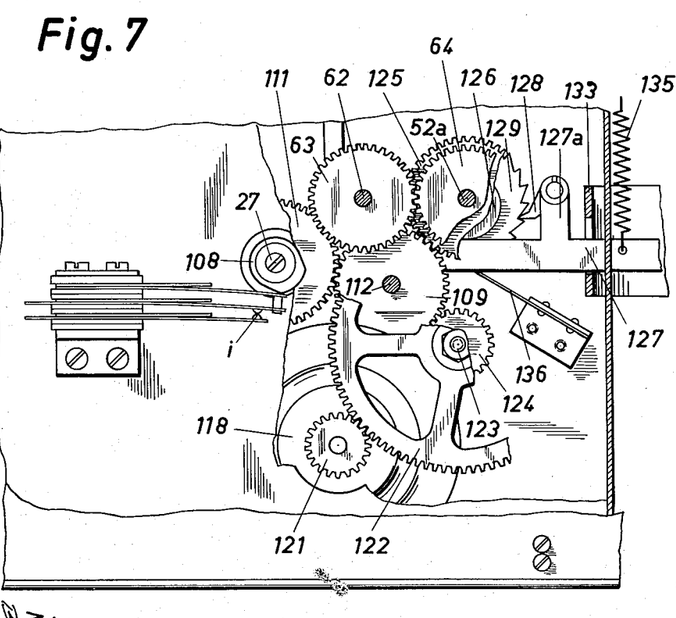
Figs. 7 and 8 show the drive as viewed from the motor in front and side view.
Figure 8:
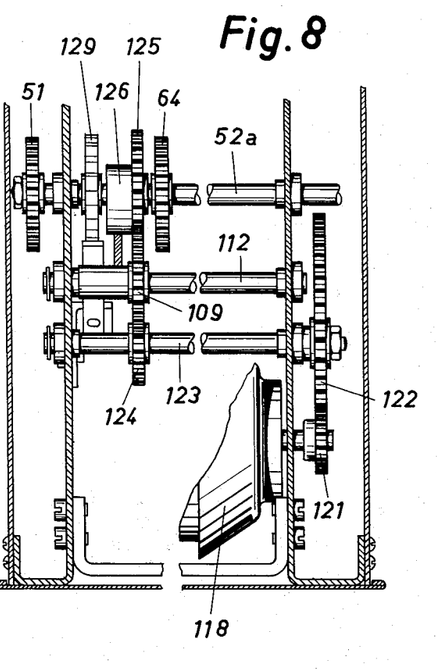

Raising of the brushes from the car while current is passing through them must be prevented since by this means harmful sparking could arise. Current must only flow as long as the brushes are placed on the contact plate, and it must be interrupted before the brushes are separated from the contact plate by the card. This is attained by the impulse contact i (Fig. 7). It is controlled by a cam 108 on the shaft 27 which rotates once per feed step. The position and dimensions of the cam 108 have been chosen in such manner that a current impulse will flow through the brushes as soon as there is a position under the same.

Figure 13:
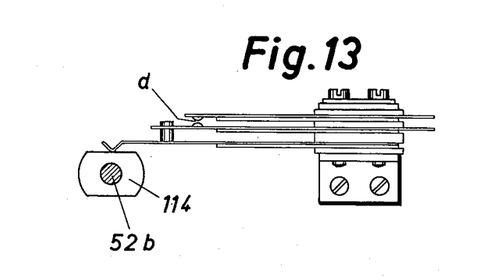
Fig. 13 shows a cam contact supplying current to the analyzers only as long as a deck is passing under the analyzers.

Moreover the current must flow to the brushes only if there is a deck under the same. If there is no deck of a card under the brushes, the current circuit to the brushes must be interrupted in order to avoid erroneous perforation. This is obtained by the contact d (Fig. 13). The latter is controlled by the cam disk 114 on the shaft 52b which rotates once per card cycle. As has been mentioned above the shaft 52b serves at the same time for the drive of the feed rollers and the card knives for the card I.

Circuit diagram (Fig. 14)

In the illustration of the circuit diagram for the card reproducer a simplified method has been chosen, as is generally used in the art of communication. If several identical units are provided, such as clutch magnets and brushes, only one of them is shown in the diagram while the remainder is indicated by the distribution connections only. The number of the units is indicated by the Arabic index number. The magnets are indicated by capitals and the contacts by small letters. Manually actuated contacts are characterized by a key-like hook on the upper end of the movable contact member. The contacts are shown in the positions which they occupy when the machine is at rest.

If the machine is switched on it will not yet start to run. Only if the start key a is depressed will the motor receive current through the same so that it will begin to run and will feed cards to the analyzing and punching device respectively. If the card I arrives with its upper deck under the set of analyzers it will actuate a card lever of known construction which has been omitted in the drawing for reasons of clarity. The card lever closes its contact $k^1$. At the same time the card II has arrived at the punching device and will actuate there also a card lever which closes the contact $k^2$. Now, current can flow from negative through the card lever contact $k^2$, the door contact $s$, the hopper contacts $m^2$, $m^1$ the card lever contact $k^1$ to the motor so that the start key $a$ can be released.

If the first hole position is under the analyzing device also the two cam contacts $i$ and $d$ are closed, so that current can flow from negative through the contacts $k^2$, $s$, $m^2$, $m^1$, $k^1$, $d$, $i$ through the brushes $b$ the plug board indicated symbolically by a circle in dotted lines, and the contact $u$ through the selector magnets W to positive. The selector magnets W will respond and will adjust the selector bars 23 whereupon perforations will be effected in card II. Shortly before the card is fed to the next hole position the cam contact $i$ opens and interrupts the whole controlling current circuit.

If the next position is under the brushes the contact $i$ closes and the current circuit will again be established as has just been described.

If the upper deck of the card I has been analyzed or if the card II has been punched the lower deck will pass under the analyzing or marking device. At the same time shifting of the selector magnets to the right hand plug field is effected by means of contacts $u$.

After analysis of the last position the card I as well as the card II will be moved to the card receiver. At the same time the contacts $u$ will be restored to their home position and the operating cycle just described will be repeated for the next card.

If one of the two card receivers is filled with cards either the contact $m^1$ or $m^2$ is opened thereby interrupting the whole current circuit and stopping the machine. The same will occur if no further cards are fed. In this instance one of the two card levers will return to its home position whereby its contact $k^1$ or $k^2$ respectively will open thereby also interrupting the current circuit.

The machine must be immediately stopped until the drive for the card run has been adjusted so that erroneous perforations are avoided, as has been mentioned above. This is obtained by the contact $s$ which opens as soon as the door of the adjusting device is opened. By this means the whole current circuit of the machine is interrupted by the contact $s$, so that the machine is stopped.

The adjusting gear per se has no immediately influence upon the current circuit of the machine.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefor, to be limited only as indicated by the scope of the following claims.

I claim:

1. In a machine for recording data upon multi-deck receiving cards under the control of multi-deck pattern cards, each kind of said cards having in each deck a plurality of adjacent record columns, each column being adapted to represent in index positions of the column a character designation, in combination, analyzing means common to all decks, recording means common to all decks, means for controlling said recording means by said analyzing means, means for feeding pattern cards consecutively to said analyzing means, means for feeding receiving cards consecutively to said recording means, both said feeding means normally operating synchronously to present corresponding decks of a pattern card and of a receiving card concomitantly to the analyzing means and to the recording means respectively, and means selectively presettable at the beginning of a record run for varying the timing of the presentation of the pattern cards to the analyzing means in predetermined stepped relation to the timing of the presentation of the receiving cards to the recording means.

2. In a machine for recording upon multi-deck receiving cards under the control of multi-deck pattern cards, each kind of said cards having in each deck a plurality of adjacent record columns, each column being adapted to represent in index positions of the column a character designation, in combination, analyzing means common to all decks, recording means common to all decks, means for controlling said recording means by said analyzing means, means for feeding pattern cards consecutively to said analyzing means, means for feeding receiving cards consecutively to said recording means, both said feeding means normally operating synchronously to present a given deck of a pattern card to the analyzing means concomitantly with the presentation to the recording means of the corresponding deck of a receiving card, and means, selectively presettable at the beginning of a record run, to impart optionally a lag or a lead to the timing of the presentation of the pattern cards to the analyzing means in comparison with the timing of the presentation of the receiving cards to the recording means, said lag or lead having an extent equal to at least one deck.

3. In a machine for recording upon multi-deck receiving cards under the control of multi-deck pattern cards, each kind of said cards having in each deck a plurality of adjacent record columns, each column being adapted to represent in index positions of the column a character designation, in combination, analyzing means common to all decks, recording means common to all decks, means for controlling said recording means by said analyzing means, means for feeding pattern cards consecutively to said analyzing means, means for feeding receiving cards consecutively to said recording means, both said feeding means normally operating synchronously to present a given deck of a pattern card to the analyzing means concomitantly with the presentation to the recording means of the corresponding deck of a receiving card, and means selectively presettable at the beginning of a record run for varying the timing of one of said card feeding means in predetermined stepped relation to the timing of the other of said card feeding means.

4. In a machine for recording upon multi-deck receiving cards under the control of multi-deck pattern cards, each kind of said cards having in each deck a plurality of adjacent record columns, each column being adapted to represent in index positions of the column a character designation, in combination, analyzing means common to all decks, recording means common to all decks, means for controlling said recording means by said analyzing means, means for feeding pattern cards consecutively to said analyzing means, means for feeding receiving cards consecutively to said recording means, both said feeding means normally operating synchronously to present a given deck of a pattern card to the analyzing means concomitantly with the presentation to the recording means of the corresponding deck of a receiving card, and means selectively presettable at the beginning of a record run to impart optionally a lag or a lead to the timing of one of said card feeding means in relation to the timing of the other of said card feeding means, said lag or lead having an extent equal to at least one deck.

5. In a machine for recording upon multi-deck receiving cards under the control of multi-deck pattern cards, each kind of said cards having in each deck a plurality of adjacent columns, each column being adapted to represent in index positions of the column a character designation, in combination analyzing means common to all decks, recording means common to all decks and operating in synchronism with said analyzing means, means for controlling said recording means by said analyzing means, means for feeding receiving cards consecutively to said recording means, means for feeding pattern cards to said analyzing means, both said feeding means normally operating synchronously to present a given deck of a pattern card to the analyzing means concomitantly with the presentation to the recording means of the corresponding deck of a receiving card, and means selectively presettable at the beginning of a record run to vary the timing of the pattern card feeding means in predetermined stepped relation to the timing of the analyzing means while leaving unchanged the timing of the receiving card feeding means relative to the timing of the recording means.

6. In a machine for punching data in multi-deck receiving cards under the control of multi-deck pattern cards, each kind of said cards having in each deck a plurality of adjacent record columns, each column being adapted to represent in index positions of the column a character designation, in combination, a single row of analyzers common to all decks, said row containing one analyzer for each column of one deck, a single row of punches common to all decks, said row of punches containing one punch for each column of one deck, means for controlling said punches by said analyzers, means for feeding pattern cards step by step past said row of analyzers in a direction transverse thereof, means for feeding receiving cards step by step past said row of punches in a direction transverse thereof, both said feeding means normally operating synchronously to present corresponding decks of a pattern card and of a receiving card concomitantly to the analyzers and to the punches respectively, and means selectively presettable at the beginning of a record run for varying the timing of the presentation of the pattern cards to the analyzers in relation to the timing of the presentation of the receiving cards to the punches.

7. In a machine for punching data in multi-deck receiving cards under the control of multi-deck pattern cards, each kind of said cards having a plurality of adjacent record columns in each deck and each column having a plurality of index positions, in combination, analyzing means for said pattern cards consisting of a row of adjacent analyzers and having one analyzer for each record column, said analyzer being common to alined record columns in the various decks, means for feeding said pattern cards step by step past said row of analyzers in a direction transverse thereof to effect analysis of the index positions of each column one by one and of the various decks successively by said row of analyzers, punching means for said receiving cards consisting of a row of adjacent punches and having one punch for each record column, said punch being common to alined record columns in the various decks, means for controlling said punches by said analyzers, means for feeding said receiving cards step by step past said row of punches in a direction transverse thereof to effect punching of the index positions of each column one by one and of the various decks successivly by said row of punches, both said feeding means normally operating synchronously to present a given deck of a pattern card to the analyzers concomitantly with the presentation to the punches of the corresponding deck of a receiving card, and means, selectively presettable at the beginning of a record run, to impart optionally a lag or a lead to the timing of the presentation of the pattern cards to the analyzers in comparison with the timing of the presentation of the receiving cards to the punches, said lag or lead having an extent equal to at least one deck.

8. In a machine for punching data in multi-deck receiving cards under the control of multi-deck pattern cards, each kind of said cards having a plurality of adjacent record columns in each deck and each column having a plurality of index positions, in combination, analyzing means for said pattern cards consisting of a row of adjacent analyzers and having one analyzer for each record column, said analyzer being common to alined record columns in the various decks, means for feeding said pattern cards step by step past said row of analyzers in a direction transverse thereof to effect analysis of the index positions of each column one by one and of the various decks successively by said row of analyzers, punching means for said receiving cards consisting of a row of adjacent punches and having one punch for each record column, said punch being common to alined record columns in the various decks, means for controlling said punches by said analyzers, means for feeding said receiving cards step by step past said row of punches in a direction transverse thereof to effect punching of the index positions of each column one by one and of the various decks successively by said row of punches, both said feeding means normally operating synchronously to present a given deck of a pattern card to the analyzers concomitantly with the presentation to the punches of the corresponding deck of a receiving card, and means selectively presettable at the beginning of a record run for varying the timing of one of said card feeding means in relation to the timing of the other of said card feeding means.

9. In a machine for recording data upon multi-deck receiving cards under the control of multi-deck pattern cards, each kind of said cards having in each deck a plurality of adjacent record columns, each column being adapted to represent in index positions of the column a character designation, in combination, analyzing means common to all decks, recording means common to all decks, means for controlling said recording means by said analyzing means, means for feeding pattern cards consecutively to said analyzing means, means for feeding receiving cards consecutively to said recording means, both said feeding means normally operating synchronously to present corresponding decks of a pattern card and of a receiving card concomitantly to the analyzing means and to the recording means respectively, an individual set of pre-settable selection means for each deck for rendering the control of said analyzers operative or inoperative on the recording means, means for automatically rendering said various sets of selection means operative one by one in accordance with the consecutive passage of the co-ordinated decks under the analyzing means and the recording means respectively, and means selectively presettable at the beginning of a record run for varying the timing of the presentation of the pattern cards to the analyzing means in relation to the timing of the presentation of the receiving cards to the recording means.

10. In a machine for recording upon multi-deck receiving cards under the control of multi-deck pattern cards, each kind of said cards having in each deck a plurality of adjacent record columns, each column being adapted to represent in index positions of the column a character designation, in combination, analyzing means common to all decks, recording means common to all decks, means for controlling said recording means by said analyzing means, means for feeding pattern cards consecutively to said analyzing means, means for feeding receiving cards consecutively to said recording means, both said feeding means normally operating synchronously to present corresponding decks of a pattern card and of a receiving card concomitantly to the analyzing means and to the recording means respectively, an individual set of pre-settable selection means for each deck for rendering the control of said analyzers operative or inoperative on the recording means, means for automatically rendering said various sets of selection means operative one by one in accordance with the consecutive passage of the coordinated decks under the analyzing means, and the recording means respectively, and means, selectively pre-settable at the beginning of a record run, to impart optionally a lag or a lead to the timing of the presentation of the pattern cards to the analyzing means in comparison with the timing of the presentation of the receiving cards to the recording means, said lag or lead having an extent equal to at least one deck.

11. In a machine for punching data in multi-deck receiving cards under the control of multi-deck pattern cards, each kind of said cards having a plurality of adjacent record columns in each deck and each column having a plurality of index positions, in combination, analyzing means for said pattern cards consisting of a row of adjacent analyzers and having one analyzer for each record column, said analyzer being common to alined record columns in the various decks, means for feeding said pattern cards step by step past said row of analyzers in a direction transverse thereof to effect analysis of the index positions of each column one by one and of the various decks successively by said row of analyzers, punching means for said receiving cards consisting of a row of adjacent punches and having one punch for each record column, said punch being common to alined record columns in the various decks, means for controlling said punches by said analyzers, means for feeding said receiving cards step by step past said row of punches in a direction transverse thereof to effect punching of the index positions of each column one by one and of the various decks successively by said row of punches, both said feeding means normally operating synchronously to present a given deck of a pattern card to the analyzers concomitantly with the presentation to the punches of the corresponding deck of a receiving card, an individual set of pre-settable selection means for each deck for rendering the control of said analyzers operative or inoperative on the punches, means for automatically rendering said various sets of selection means operative one by one in accordance with the consecutive passage of the co-ordinated decks under the analyzers and the punches respectively, and means, selectively pre-settable at the beginning of a record run, to impart optionally a lag or a lead to the timing of the presentation of the pattern cards to the analyzers in comparison with the timing of the presentation of the receiving cards to the punches, said lag or lead having an extent equal to at least one deck.

References Cited in the file of this patent
UNITED STATES PATENTS

| | | |
|---|---|---|
| Re. 21,133 | Lake | June 27, 1939 |
| 1,691,917 | Braitmayer | Nov. 20, 1928 |
| 1,791,950 | Bryce | Feb. 10, 1931 |
| 2,045,977 | Bryce | June 30, 1936 |
| 2,240,667 | Paris | May 6, 1941 |
| 2,566,931 | Cunningham | Sept. 4, 1951 |